US010003543B2

(12) United States Patent
Ajitomi et al.

(10) Patent No.: US 10,003,543 B2
(45) Date of Patent: Jun. 19, 2018

(54) COMMUNICATION DEVICE, COMMUNICATION SYSTEM, AND COMMUNICATION METHOD

(71) Applicant: KABUSHIKI KAISHA TOSHIBA, Tokyo (JP)

(72) Inventors: Daisuke Ajitomi, Tokyo (JP); Keisuke Minami, Kanagawa (JP); Hiroyuki Aizu, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 134 days.

(21) Appl. No.: 14/849,996

(22) Filed: Sep. 10, 2015

(65) Prior Publication Data

US 2016/0087907 A1 Mar. 24, 2016

(30) Foreign Application Priority Data

Sep. 18, 2014 (JP) .................................. 2014-190438

(51) Int. Cl.
*H04L 12/28* (2006.01)
*H04L 12/841* (2013.01)
(Continued)

(52) U.S. Cl.
CPC ............ *H04L 47/28* (2013.01); *H04L 45/026* (2013.01); *H04L 47/16* (2013.01)

(58) Field of Classification Search
CPC ....... H04L 47/28; H04L 45/02; H04L 45/021; H04L 45/026; H04L 47/10; H04L 47/11; H04L 47/115; H04L 47/12; H04L 47/122
See application file for complete search history.

(56) References Cited

U.S. PATENT DOCUMENTS 6,233,232 B1 *   5/2001  Chau ................... H04L 12/4633
                                                        370/351
7,639,663 B1 *  12/2009  Nerses ..................... H04L 47/14
                                                        370/347
(Continued)

FOREIGN PATENT DOCUMENTS

JP          2006-203575         8/2006
JP          2012-37944          2/2012
(Continued)

OTHER PUBLICATIONS

English-language machine translation of JP2006-203575.
English-language machine translation of JP2012-222378.
English-language machine translation of WO2014/013674.

*Primary Examiner* — Kevin Mew
(74) *Attorney, Agent, or Firm* — Nixon & Vanderhye, P.C.

(57) ABSTRACT

According to one embodiment, a communication device includes: a communicator, a first circuitry and a second circuitry. The communicator establishes a communication connection with a destination communication device over a communication network and to communicate a packet relating to first information using the communication connection. The first circuitry determines a transmission interval of a packet relating to second information that is different from the first information, based on characteristic information on the communication network. The second circuitry performs control to transmit the packet relating to the second information to the destination communication device using the communication connection in accordance with the transmission interval determined by the first circuitry during at least a time period when the communication connection is established and communication of the packet relating to the first information is not performed.

18 Claims, 10 Drawing Sheets

(51) Int. Cl.
  *H04L 12/751*    (2013.01)
  *H04L 12/801*    (2013.01)

(56) References Cited

U.S. PATENT DOCUMENTS

| | | | |
|---|---|---|---|
| 7,801,051 B2* | 9/2010 | Mori | H04L 47/10 |
| | | | 370/242 |
| 7,965,729 B2* | 6/2011 | Veeraraghavan | H04L 1/22 |
| | | | 370/428 |
| 9,083,671 B2 | 7/2015 | Wada | |
| 2006/0198324 A1* | 9/2006 | Nerses | H04B 7/155 |
| | | | 370/260 |
| 2007/0147241 A1* | 6/2007 | Wang | H04L 47/10 |
| | | | 370/230 |
| 2007/0206628 A1* | 9/2007 | Nishio | H04B 7/15528 |
| | | | 370/445 |
| 2008/0049753 A1* | 2/2008 | Heinze | H04L 12/5695 |
| | | | 370/392 |
| 2009/0300379 A1* | 12/2009 | Mian | G01D 9/005 |
| | | | 713/300 |
| 2013/0246641 A1* | 9/2013 | Vimpari | H04L 47/10 |
| | | | 709/228 |
| 2014/0056313 A1 | 2/2014 | Wada | |
| 2014/0092418 A1 | 4/2014 | Kishimoto | |
| 2014/0297878 A1 | 10/2014 | Minami et al. | |
| 2016/0191364 A1* | 6/2016 | Ajitomi | H04L 43/10 |
| | | | 709/224 |

FOREIGN PATENT DOCUMENTS

| | | |
|---|---|---|
| JP | 2012-222378 | 11/2012 |
| JP | 2014-075655 | 4/2014 |
| JP | 2014-199998 | 10/2014 |
| WO | 2014/013674 | 6/2016 |

* cited by examiner

| LOCAL IP | LOCAL PORT | GLOBAL IP | GLOBAL PORT | OTHER |
|---|---|---|---|---|
| 192.168.10.2 | 10000 | 10.1.1.2 | 30000 | PROTOCOL (TCP, UDP, ICMP), TIME STAMP VALUE OF LAST COMMUNICATION, STATES OF INSIDE/OUTSIDE CONNECTIONS (e.g., ESTABLISHED), AND THE LIKE |
| ... | ... | ... | ... | ... |

FIG. 2

| ENTRY IDENTIFICATION INFORMATION | TRANSMISSION INTERVAL INFORMATION | TRANSMISSION INTERVAL STATE INFORMATION | RELAY DEVICE INFORMATION | NETWORK INFORMATION |
|---|---|---|---|---|
| ·UUID OF RELAY DEVICE<br>·MAC ADDRESS OF RELAY DEVICE<br>AND THE LIKE | ·NUMERICAL DATA | ·BINARY VALUE REPRESENTING DETERMINED/ UNDETERMINED | ·MODEL NAME<br>·MODEL TYPE<br>·SERIAL NUMBER<br>·MAC ADDRESS<br>·MANUFACTURER'S INFORMATION<br>·MANUFACTURE DATE INFORMATION<br>AND THE LIKE | ·CONTRACTED NETWORK INFORMATION<br>·CONTRACTED PROVIDER INFORMATION<br>·PROXY INFORMATION<br>·TRACEROUTE INFORMATION<br>AND THE LIKE |

FIG. 3

| RELAY DEVICE IDENTIFICATION INFORMATION | TRANSMISSION INTERVAL INFORMATION | NUMBER OF SAMPLES |
|---|---|---|
| MODEL INFORMATION (MODEL TYPE OR MODEL NAME) | NUMERICAL DATA | NUMERICAL DATA |

| NETWORK IDENTIFICATION INFORMATION | CONTRACTED PROVIDER IDENTIFICATION INFORMATION | TRANSMISSION INTERVAL INFORMATION | NUMBER OF SAMPLES |
|---|---|---|---|
| NETWORK SERVICE PROVIDER NAME AND THE LIKE | CONTRACTED PROVIDER NAME AND THE LIKE | NUMERICAL DATA | NUMERICAL DATA |

FIG. 9

COMMUNICATION DEVICE, COMMUNICATION SYSTEM, AND COMMUNICATION METHOD

CROSS-REFERENCE TO RELATED APPLICATIONS

This application is based upon and claims the benefit of priority from Japanese Patent Application No. 2014-190438, filed Sep. 18, 2014; the entire contents of which are incorporated herein by reference.

FIELD

Embodiments described herein relate to a communication device, a communication system, and a communication method.

BACKGROUND

WebSocket is known as a Web standard communications protocol that keeps (maintains) an established communication connection and achieves bidirectional low-delay communication. Remote control system technologies using both this WebSocket and a polling system have been proposed. There is a known problem with WebSocket communication in that an interposed relay device (e.g., broadband router) disconnects a communication connection when a no-communication state continues for a certain amount of time. In the above-mentioned remote control system technologies, there is no disclosed method that avoids or solves this problem, specifically, a mechanism that can keep a communication connection for a long time. In general, a mechanism to keep a communication connection is known, where keep-alive packets are transmitted at a short cycle (e.g., one minute) to keep a communication connection.

In a scheme in which keep-alive packets are transmitted at a short cycle, in the case where it is required to accommodate a large number of clients, a communication cost or a CPU load due to the transmission of keep-alive packets becomes considerable. Especially, many of cloud computing services, which have been in widespread use nowadays, adopt usage-based rates on their communications, and thus increasing traffic has direct influence on an operational cost, which is required to be reduced as much as possible.

BRIEF DESCRIPTION OF THE DRAWINGS

FIG. 2 is a diagram showing an example of a NAT table saved in a relay device;

FIG. 3 is a diagram showing a form of communication maintenance/management information;

FIG. 9 is a diagram showing an example of first and second connection management information.

DETAILED DESCRIPTION

According to one embodiment, a communication device includes: a communicator, a first circuitry and a second circuitry. The communicator establishes a communication connection with a destination communication device over a communication network and to communicate a packet relating to first information using the communication connection. The first circuitry determines a transmission interval of a packet relating to second information that is different from the first information, based on characteristic information on the communication network. The second circuitry performs control to transmit the packet relating to the second information to the destination communication device using the communication connection in accordance with the transmission interval determined by the first circuitry during at least a time period when the communication connection is established and communication of the packet relating to the first information is not performed.

Embodiments of the present invention will be described below with reference to the drawings.

First Embodiment

Figure 1:
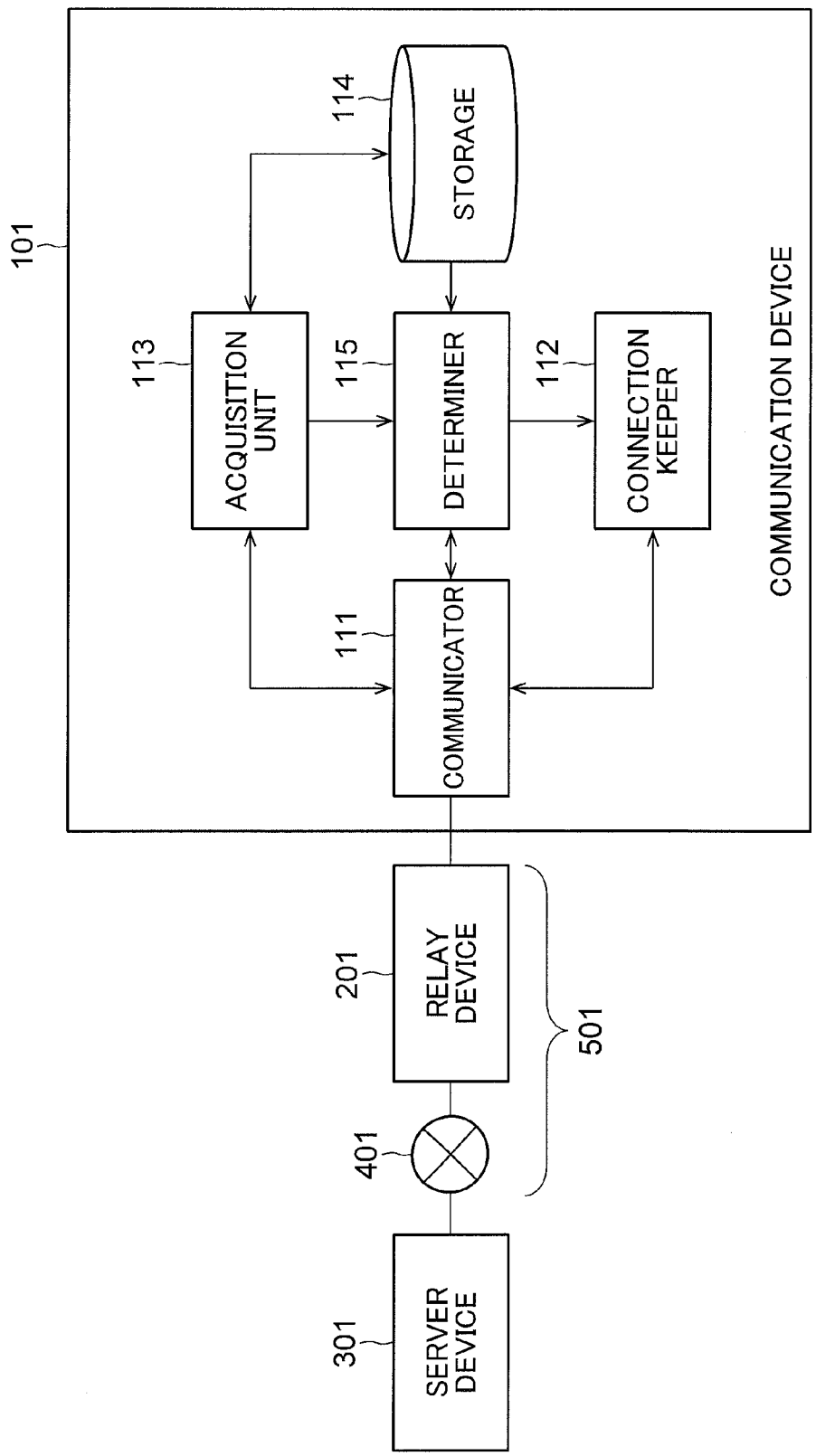
FIG. 1 is a diagram showing a communication system in a first embodiment.

FIG. 1 shows a communication system in a first embodiment of the present invention. This communication system includes a communication device 101 and a server device 301, which are connected to each other over a communication network 501. The communication network 501 includes a relay device 201 and a network 401 that is upstream of the relay device 201. The communication device 101 is connected to the relay device 201 in a wireless or wired manner. The server device 301 is connected to the network 401 in a wired or wireless manner. The network 401 may be a wide area network such as the Internet or may be a local network. In addition, the network 401 may be a wired network, a wireless network, or a hybrid network thereof. In the present embodiment, the network 401 is assumed to be the Internet. The communication device 101 can communicate with the server device 301 under WebSocket, which is known as a Web standard communications protocol. In WebSocket, a WebSocket connection is made between the communication device 101 and the server device 301 on a TCP connection using HTTP, any one of the server device 301 and the communication device 101 can thereafter transmit data with any timing using the WebSocket connection. There is no need to establish a TCP connection in every data transmission, and a TCP connection that is once established can be continuously used.

The server device 301 basically has a hardware configuration of typical computers including a CPU, a main memory, an auxiliary memory, a communication interface, and the like. The server device 301 is a form of a communication device to be a communication object for the communication device 101. The server device 301 may be provided as a PC, a digital television, and a hard disk recorder, or a digital device such as a tablet and a smartphone. As to the configuration of the server device 301, there are different variations in configuration about a CPU, the number or capacity of main memories, auxiliary memories, and the like, a connection interface standard, and the like. The server device 301 may be a virtual machine that runs on a cloud system.

The communication device 101 is a device that has a function that enables communication with the server device 301 over the communication network 501, that is, via the relay device 201 and over the network 401. The communication device 101 basically has a hardware configuration of typical computers including a CPU, a main storage (e.g., volatile or nonvolatile memory), an auxiliary storage (e.g., SSD, hard disk), and a communication interface. Specific examples of the communication device 101 include a PC, a set top box (STB), a digital television, and a hard disk recorder, as well as a digital device such as a tablet and a smartphone. The communication device 101 may be a powerless device such as a white goods and a sensor. The communication device 101 may be a device in any form as long as it has the function that enables communication with the server device 301. For example, the communication device 101 can be, for example, a relay device such as a broadband router.

The relay device 201 is a device that is installed on a communication route between the communication device 101 and the server device 301. For example, the relay device 201 is assumed to be a device of any type such as a router on a public network, a broadband router or an ONU installed in a home, a load balancer installed in an intranet on a server-side such as a data center, a firewall, and a proxy. In the present embodiment, the relay device 201 is assumed to be, in particular, a broadband router that can directly communicate with the communication device 101.

The relay device 201 controls the inputs and outputs of packets from the inside to the outside (outbound) and from the outside to the inside (inbound) under a NAT table as shown by the example in FIG. 2 and in accordance with a routing table (not shown) as needed. That is, the relay device 201 controls the transfer of packets received from the communication device 101 side (inside), to the network 401 side (outside), and the transfer of the packets received from the network 401 side, to the communication device 101 side.

An entry in the NAT table contains a local IP, a local port, a global IP, a global port, and the other items. In this example, the local IP is the local IP address of the communication device 101 and the local port is the number of a port that an application in the communication device 101 uses for communication with the server device 301. The global IP is an IP address that is allocated to a user of the communication device 101 and the global port is the port number of a converting destination of the local port. The source IP address and the port number of an outbound packet are converted into a global IP address and a global port number in accordance with a relevant entry in the NAT table (an entry having a matched local IP address and a matched local port number) and output from an output interface. In some configurations, the output interface to output packets may be determined in accordance with the routing table.

The other items in the entry contain the type of a communications protocol, the time stamp of the last communication, and the states of inside/outside TCP connections. As an example of the states of the TCP connections, a value relating to the states of the TCP connections with the communication device 101 and the server device 301 are set. For example, when both the TCP connections with the communication device 101 and the server device 301 become "ESTABLISHED" (when the TCP connections are established), "ESTABLISHED" is set to both the inside and the outside (inside/outside=ESTABLISHED/ESTABLISHED).

When the relay device 201 receives, for example, a packet of a request to establish a TCP connection from the communication device 101 to the server device 301, the relay device 201 creates an entry in the NAT table and transfers the packet. Thereafter, when detecting the establishment of the TCP connection from a TCP flag of a packet that is exchanged between the server device 301 and the communication device 101, the relay device 201 sets "ESTABLISHED." While an entry in which both the inside and the outside are set to "ESTABLISHED" exists, the relay device 201 keeps the TCP connection of the entry between the communication device 101 and the server device 301, and thus communication using this TCP connection between the communication device 101 and the server device 301 (e.g., WebSocket communication or communication for measurement to be described below. Note that these communications may be performed using separate TCP connections) can be performed without being blocked by the relay device 201.

When, for example, no TCP connection of this entry occurs in an outbound or inbound direction for a certain period of time from a time point of the time stamp of the last communication, the relay device 201 determines a timeout, and deletes the entry, sets the state of the TCP connection closed, or the like (hereafter, they may be expressed that the TCP connection is disconnected by the relay device). In this case, when the communication device 101 tries performing the communication with the server device 301 on WebSocket using the established TCP connection, the TCP connection is disconnected by the relay device 201, and the communication is blocked at the relay device 201. For this reason, the communication device 101 needs to redo an establishing procedure for a TCP connection. In the case of a WebSocket communication, it is needed to disconnect the current WebSocket connection and redo the establishment of a TCP connection. To avoid this, after a WebSocket connection is established, a keep-alive packet is transmitted before a timeout occurs in the relay device 201, which causes a time point of the time stamp of the last communication to be updated, and it is thus possible to keep a TCP connection in the relay device 201.

The setting of a timeout (connection keeping period) in the relay device 201 may differ between outbound communication and inbound communication. In this case, the time point of the time stamp of the last communication may be separately managed in the outbound communication and inbound communication.

The states of TCP connections are managed here with an entry in the NAT table or the other optional items, but a method in which the management is not performed using the NAT table itself is possible. For example, a possible method is to create an entry in a given table when both the states of TCP connections between the communication device 101 and the server device 301 become "ESTABLISHED," and delete the entry when one or both the states of the TCP connections become "CLOSED" or delete the entry based on some timeout policy in the NAT.

Also in the network 401, there are may be various intermediate nodes of providers, network service providers, and the like (e.g., provider-side relay devices) besides the relay device 201. The provider-side relay devices and the like can be assumed to be any type of devices such as a router, a load balancer, a firewall, and a proxy. These provider-side relay devices and the like may each generate an entry in its table, and manage TCP connections as with the relay device 201. If a timeout occurs, an entry relating to the TCP connection in question may be deleted. The timeout may be separately managed in the inbound and the outbound. When a provider-side relay device has a filtering function such as a firewall, and communication is absent for a certain time period by this filtering function, packets may be blocked in a direction in which the communication is absent.

The communication device 101 in FIG. 1 includes a communicator 111, a connection keeper 112, an acquisition unit 113, a storage 114, and a determiner 115. The connection keeper 112, the acquisition unit 113, the determiner 115, and part of the communicator 111 may be implemented by a processor such as a CPU executing computer programs. A communicator 111, a connection keeper 112, an acquisition unit 113 and a determiner 115 can implemented by circuitry such as a processor or an integrated circuit. Each circuitry which implements a communicator 111, a connection keeper 112, an acquisition unit 113 and a determiner 115 may be different physical circuitry or all or a part of them may be same physical circuitry. The storage 114 may be configured by any storage device such as a memory or storage. The memory may be volatile memory such as SRAM or DRAM, or non-volatile memory such as NAND, FRAM or MRAM. The storage may generally be any device which can memorize data permanently such as an HDD, an optical disc or SSD. The term "circuitry" may indicate one circuit, a plurality of circuits, or a system of circuits.

The communicator 111 establishes a communication connection with the server device 301 over the communication network 501, and communicates with the server device 301 using the communication connection. The communication connection is assumed to be a TCP connection but not limited to this, and a connection under the other communications protocol is possible as long as the state of the connection can be managed by the relay device 201 or the like.

The communicator 111 includes a functional component having a NIC (Network Interface Card) and a TCP/IP communication stack. The TCP/IP stack may be one implemented on the NIC as hardware, or may be software implemented on an operating system (OS) or implemented as a driver. In addition, the transport layer is not limited in TCP but may be in UDP. The physical layer/MAC layer may be based on not only Ethernet® but also a wireless LAN standard such as Wi-Fi, or InfiniBand or the like.

The connection keeper 112 transmits packets to keep the connection (keep-alive packets or heartbeat packets, which will be hereafter uniformly referred to as keep-alive packets) with timing under a predetermined method such that the TCP connection is not disconnected by the relay device 201 or the like. Packets in normal WebSocket data communication can be referred to as packets relating to first information, and keep-alive packets can be referred to as packets relating to second information that is different to the first information. Conceivable transmission timing of keep-alive packets is basically a periodic timing, but transmission timing is not necessarily constant. The source IP address, source port number, destination IP address, and destination port number of a keep-alive packet are the same values as those used in the above-mentioned communication connection that is intended to be kept. The connection keeper 112 transmits keep-alive packets with timing based on an instruction from the determiner 115 to be described below, or with timing of every certain period based on transmission interval information stored in the storage 114 to be described below.

When a keep-alive packet is received by the server device 301, an ACK packet is transmitted as a response under TCP. The ACK packet is received by the communicator 111 and the connection keeper 112 receives the notification of the reception from the communicator 111, which allows the connection keeper 112 to determine that the transmission of the keep-alive packet has succeeded. The success/failure in the transmission of the keep-alive packet is here confirmed with an ACK packet of TCP, but the success/failure may be confirmed with a response packet, which is transmitted in the WebSocket protocol level. For example, a PING frame of the WebSocket protocol may be transmitted, and the server device 301 may transmit a PONG frame as a response thereto.

The acquisition unit 113 acquires characteristic information on the communication network 501 (hereafter, referred to as communication maintenance information) as information necessary to keep the communication between the communication device 101 and the server device 301. Acquiring methods include acquisition through communication via the communicator 111, an external input by a user, or both of them. The characteristic information on the communication network 501 (communication maintenance information) contains information on the relay device 201 that is interposed between the server device 301 and the communication device 101 (hereafter, relay device information), information on the network 401 that is upstream of the relay device 201, or both of them. The information on the upstream network 401 (network information) may contain, for example, information with which a contracted network or provider can be specified, and may contain relay device information on relay devices existing on the communication route to the server device 301 in the upstream network 401. Note that the relay device 201 is one of the relay devices existing on the communication route to the server device 301 in the communication network 501. The network information may be acquired at the same time with the above-described relay device information, or may be acquired separately. The acquisition unit 113 creates communication maintenance/management information that contains the acquired connection maintenance information, and stores the entry of the created communication maintenance/management information in the storage 114.

A specific example of the relay device information will be described below. Here, the relay device information on the relay device 201 will be described here by way of example, but similar form can be applied to relay devices existing in the upstream network 401.

(1-1) Information with which the relay device 201 can be identified (UUID, MAC address, (model type or model name)+serial number. Host name or IP address, or the combination of one of a host name and an IP address and a port number is possible)

(1-2) Information with which the model of the relay device 201 can be specified (model name or model type), or information with which the model can be inferred (serial number, MAC address, manufacturer's information, manufacture date information) (hereafter, collectively referred to as model information)

(1-3) Information with which disconnection timing of communication connection in the relay device 201 can be specified (a timeout value of TCP communication)

A method in the case of acquiring the relay device information on the relay device 201 via the communicator 111 is typically assumed to be the use of UPnP (Universal Plug and Play), but it does not matter what communications protocol is used as long as the information on the above-described relay device 201 can be collected thereunder.

The storage 114 stores inside thereof the communication maintenance/management information created by the acquisition unit 113.

The storage 114 may be a storage device such as an SSD and a hard disk, a nonvolatile memory such as a DRAM, or a nonvolatile memory such as an MRAM and a NAND flash memory. Alternatively, the storage 114 may be an external storage medium (e.g., a memory card, a memory stick, a hard disk) that is externally attached to the communication device 101.

FIG. 3 shows an example of an entry in communication maintenance/management information in the first embodiment. In FIG. 3, the communication maintenance/management information contains, in addition to connection maintenance information (relay device information and network information), entry identification information, transmission interval information, and transmission interval state information.

As entry identification information, the identification information on the relay device 201 (e.g., a MAC address or a UUID) can be used. However, the identification of an entry does not always depend on the relay device 201, and thus the combination of the identification information on the relay device 201 and identification information on the network information (contracted network identification information+contracted provider identification information) may be used, or identification information that is separately created may be used.

The transmission interval information is numerical data that represents a transmission interval of keep-alive packets. The unit thereof may be any unit such as minutes, seconds, and milliseconds.

The transmission interval state information is a binary value that represents whether the transmission interval of keep-alive packets has been determined. The transmission interval state information is not mandatory.

The relay device information is, as mentioned above, information relating to a relay device (here, the relay device 201). Attributes such as a model name and a model type may form individual columns, or may be saved in one column in a structured form such as JSON and XML.

The network information is information relating to the network 401, which is upstream of the relay device 201 and, as mentioned above, contains the contracted network information, the contracted provider information, and the relay device information on the relay devices existing in the network 401. The network information may be acquired by the acquisition unit 113 or may be manually registered by a user. In the latter case, the communication device 101 may include a Web page for input, an interface such as a WebAPI, or a physical input interface.

The form of the communication maintenance/management information shown in FIG. 3 is merely an example and not limited to this.

For example, the variations described below are possible.

The communication maintenance/management information may be divided into a plurality of tuples (i.e., a plurality of tables). As an example, the communication maintenance/management information in FIG. 3 may be divided into network information and the other information. Alternatively, the communication maintenance/management information may be divided three pieces of information, relay device information, network information, and the other information. Some columns of the communication maintenance/management information in FIG. 3 may be deleted.

For example, network information may be deleted. Alternatively, the relay device information relating to the relay device 201 or network information relating to a plurality of relay devices upstream thereof may contain information on connection relationship between these relay devices (e.g., the relay device 201A—the relay device 201B—the communication device 101). If relay device information on a plurality of relay devices can be acquired, a plurality of pieces of relay device information may be contained in one entry, to make entry identification information a set of the identifiers (MAC addresses) of these relay devices.

The determiner 115 has a function of determining a transmission interval of keep-alive packets. The determiner 115 performs a determining process of the transmission interval in the case where, for example, there is no entry in the communication maintenance/management information, there is an entry but transmission interval state information in the entry is a value indicating "undetermined," or where the state where the transmission interval is determined (determined state) is shifted to the state where the transmission interval is undetermined (undetermined state).

Specifically, the following cases are opportunities to start the operation of the transmission interval determining process by the determiner 115.

(2-1) At the time of the initial start or the reinitialization of the communication device 101

(2-2) At the time of the restart of the communication device 101 (e.g., if transmission interval information is erased during stop (e.g., in the case where the transmission interval information is stored in a volatile memory))

(2-3) At the time of the reset of a transmission interval in the communication device 101 (the communication device 101 includes an interface to reset or redetermine the transmission interval)

(2-4) At the time when the communication device 101 detects a relay device other than the relay device 201

(2-5) At the time of receiving an instruction message of redetermining a transmission interval from the server device 301

(2-6) At the time of detecting a failure of the transmission of a keep-alive packet (when no response for the transmission of a keep-alive packet is received from the server device 301)

The following methods are possible for example as methods of determining a transmission interval of keep-alive packets.

(3-1) The determiner 115 of the communication device 101 transmits connection maintenance information (relay device information and in addition network information) to the server device 301 using the communicator 111 and acquires transmission interval information from the server device 301 as a response thereto. The determiner 115 determines a value indicated by the acquired transmission interval information as the transmission interval of keep-alive packets.

Note that the specific operation on the server device 301 side will be described in a second embodiment, and briefly describing here, the server device 301 manages transmission interval information associating it with the relay device information on the relay device 201 (e.g., model information) or network information and transmits corresponding transmission interval information based on the connection maintenance information received from the communication device 101.

(3-2) The acquisition unit 113 also acquires the transmission interval information from a user inputting unit, the relay device 201, or the like, and uses the transmission interval information.

(3-3) The determiner 115 transmits keep-alive packets and checks for the success/failure in communication while varying the transmission interval (e.g., increasing the transmission interval by a certain amount of time at every transmission) to determine the transmission interval. This includes two conceivable cases, one in which it is performed by the communication device 101 alone and another in which it is performed in association with the server device 301, which will be described in detail below.

Figure 4:
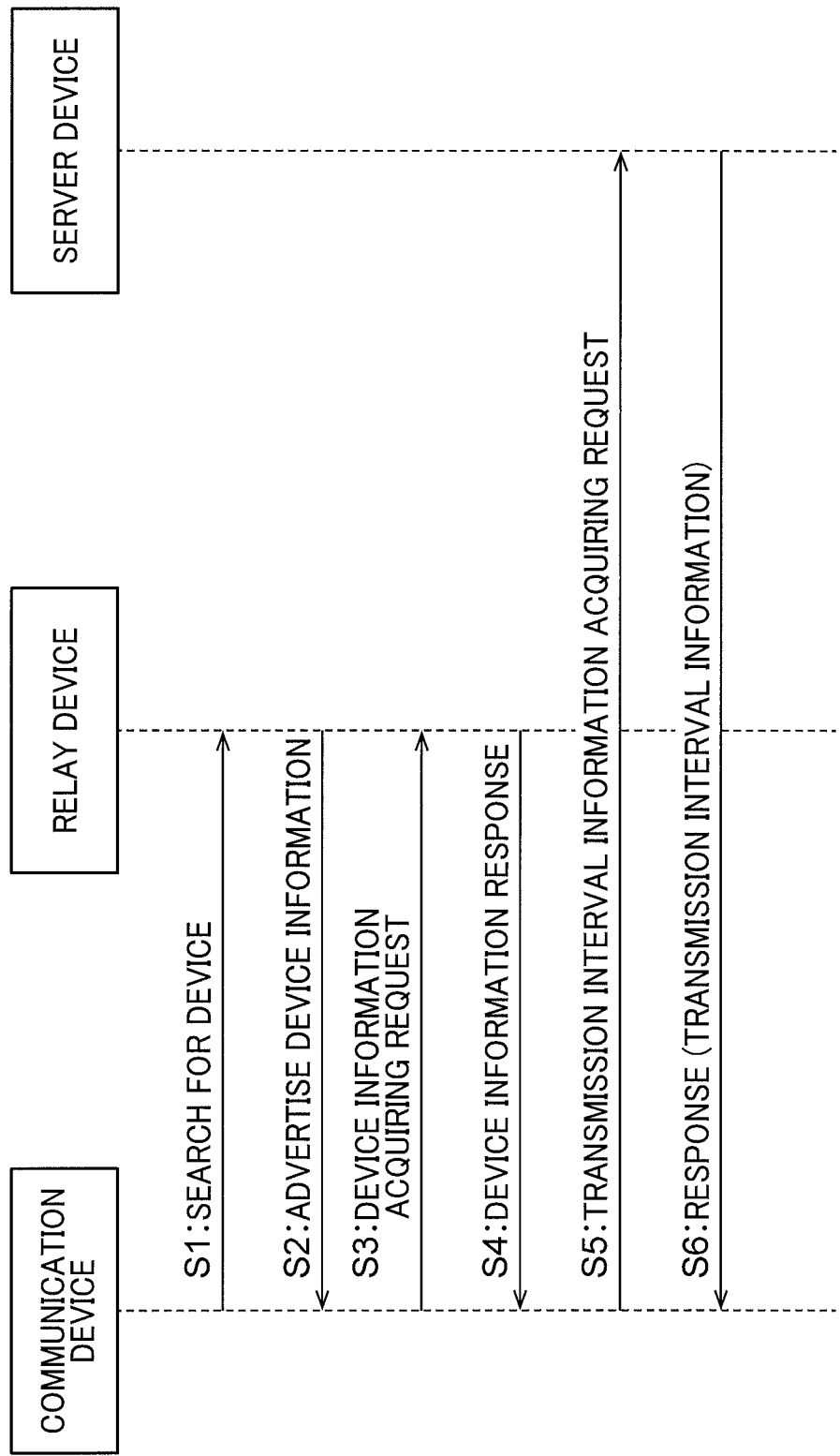
FIG. 4 is a diagram showing an example of a communication sequence among a communication device, the relay device, and a server device.

FIG. 4 shows an example of a communication sequence among the communication device 101, the relay device 201, and the server device 301. The opportunities of starting this communication sequence include the initial start, reinitialization, restart, and the like of the communication device 101.

The communication device 101 transmits a device searching message to search for the relay device 201 (step S1). For example, in the case of using UPnP as a communications protocol, the search can be performed under the Search protocol. Other communications protocols may be used as long as an equivalent function can be achieved therewith.

The relay device 201 transmits a device information advertising message to response to the search from the communication device 101 (step S2). In the case where the communications protocol is UPnP, a response can be made under the (Advertisement) protocol of UPnP as a response protocol. Other communications protocols may be used as long as an equivalent function can be achieved therewith.

The acquisition unit 113 of the communication device 101 acquires relay device information from the relay device 201 (steps S3 and S4). Specifically, a device information acquisition request message is transmitted to the relay device 201 (S3), a device information response message is received from the relay device 201 (S4), and the relay device information is extracted from the device information response message. In the case where the communications protocol is UPnP, a response message that contains Description (file) is received, and the relay device information can be extracted from the Description. Other communications protocols may be used as long as an equivalent function can be achieved therewith. In addition, at this point, network information may be acquired concurrently with the acquisition of the relay device information. For example, in the case of Description of UPnP, information with which a contracted network can be inferred (carrier information) may be acquired from information that is contained in a manufacturer attribute contained in the Description (XML message). Alternatively, it is conceivable to acquire the network information by transmitting a route checking message such as Traceroute and acquiring a response to this. The communication device 101 creates an entry of communication maintenance/management information that contains the acquired relay device information (and the network information) and registers the entry in the storage 114. If the entry has already existed, this registering process may be omitted, or the entry that has already existed may be overwritten with the relay device information acquired this time (and the network information).

When the acquisition unit 113 can acquire the relay device information (and the network information) and the transmission interval of keep-alive packets is undetermined at this point, the communication device 101 transmits a transmission interval information acquisition requesting message that contains the relay device information (and the network information) to the server device 301 (S5). Specific examples include the transmission of an HTTP GET request. However, any protocol may be used as long as an equivalent function can be achieved with the protocol. A response message is received from the server device 301, the transmission interval information is extracted from the response message (S6). The value of the extracted transmission interval information is set to a relevant entry in the storage 114, and "determined" is set to the transmission interval state information.

Note that, thereafter, if WebSocket communication with the server device 301 is started (or the WebSocket communication has already been started), the communication device 101 transmits a keep-alive packet in accordance with the value of the transmission interval information. This prevents the connection from being disconnected by the relay device 201 or the like (e.g., the entry is deleted from a NAT table), and it can be expected that a TCP connection (and the WebSocket connection) can be kept (the value of the transmission interval information is assumed to be greater than or equal to the value of timeout in the relay device 201 or the like). Note that keep-alive packets are transmitted at least while normal WebSocket data communication using the TCP connection is stopped (i.e., not performed) between the communication device 101 and the server device 301. At this point, a time point at which the last communication is performed may be monitored, and keep-alive packets may be transmitted at the above-described transmission intervals beginning from the last time point. However, keep-alive packets may be transmitted independently of whether the normal WebSocket data communication is performed.

In this communication sequence, the relay device 201 is discovered by transmitting a device searching message and receiving a response frame therefor, but the relay device 201 may be discovered not by transmitting a device searching message but by receiving an Advertisement message that the relay device 201 periodically transmits. In addition, the operation of steps S3 and S4 may be omitted by configure information acquired from the Description in step S4 to be contained in an Advertisement message transmitted in step S2.

Figure 5:
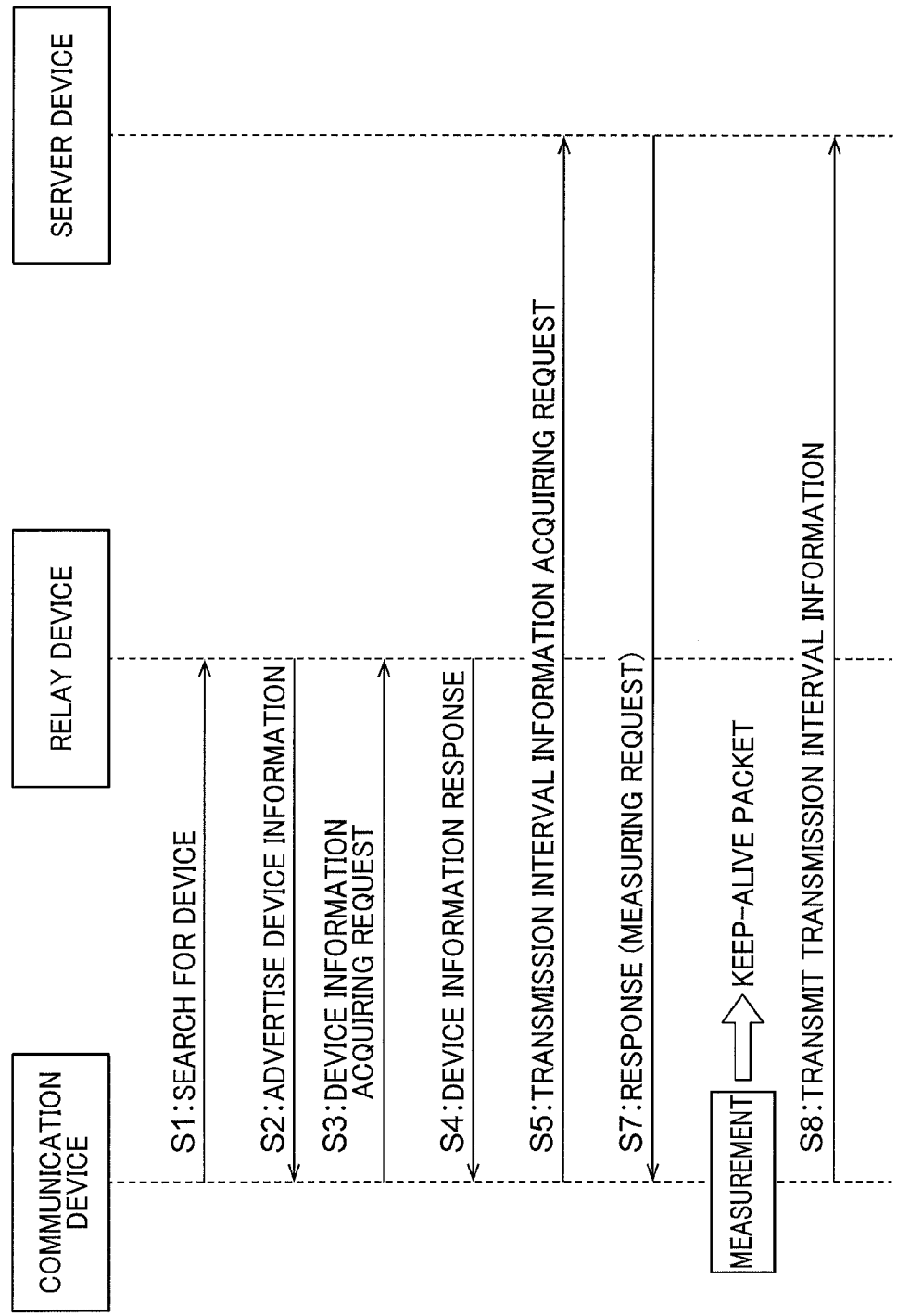
FIG. 5 is a diagram showing another example of the communication sequence among the communication device, the relay device, and the server device.

FIG. 5 shows another example of the communication sequence among the communication device 101, the relay device 201, and the server device 301. Steps S1 to S5 are similar to those in FIG. 4, and these steps will not be described.

After the communication device 101 transmits a transmission interval information acquisition requesting message in step S5, a response message that contains a measuring instruction is received from the server device 301 (S7). The communication device 101 performs a transmission interval measuring process under the measuring instruction contained in the response message to determine the transmission interval of keep-alive packets. The transmission interval measuring process will be described in detail below. The communication device 101 sets the determined value of transmission interval to transmission interval information in the relevant entry in the storage 114. In addition, "determined" is set as the value of transmission interval state information.

The communication device 101 transmits the transmission interval information representing the value of transmission interval determined in the transmission interval measuring process to the server device 301 as feedback (S8). Note that the feedback of the transmission interval information may be omitted.

Note that, thereafter, when the communication device 101 starts WebSocket communication containing the setting of a TCP connection with the server device 301, the communication device 101 transmits keep-alive packets in accordance with the value of the transmission interval in the relevant entry to prevent the connection from being disconnected by the relay device 201 or the like due to timeout or the like (e.g., the entry is deleted from a NAT table). This allows the communication with the server device 301 to be kept.

Figure 6:
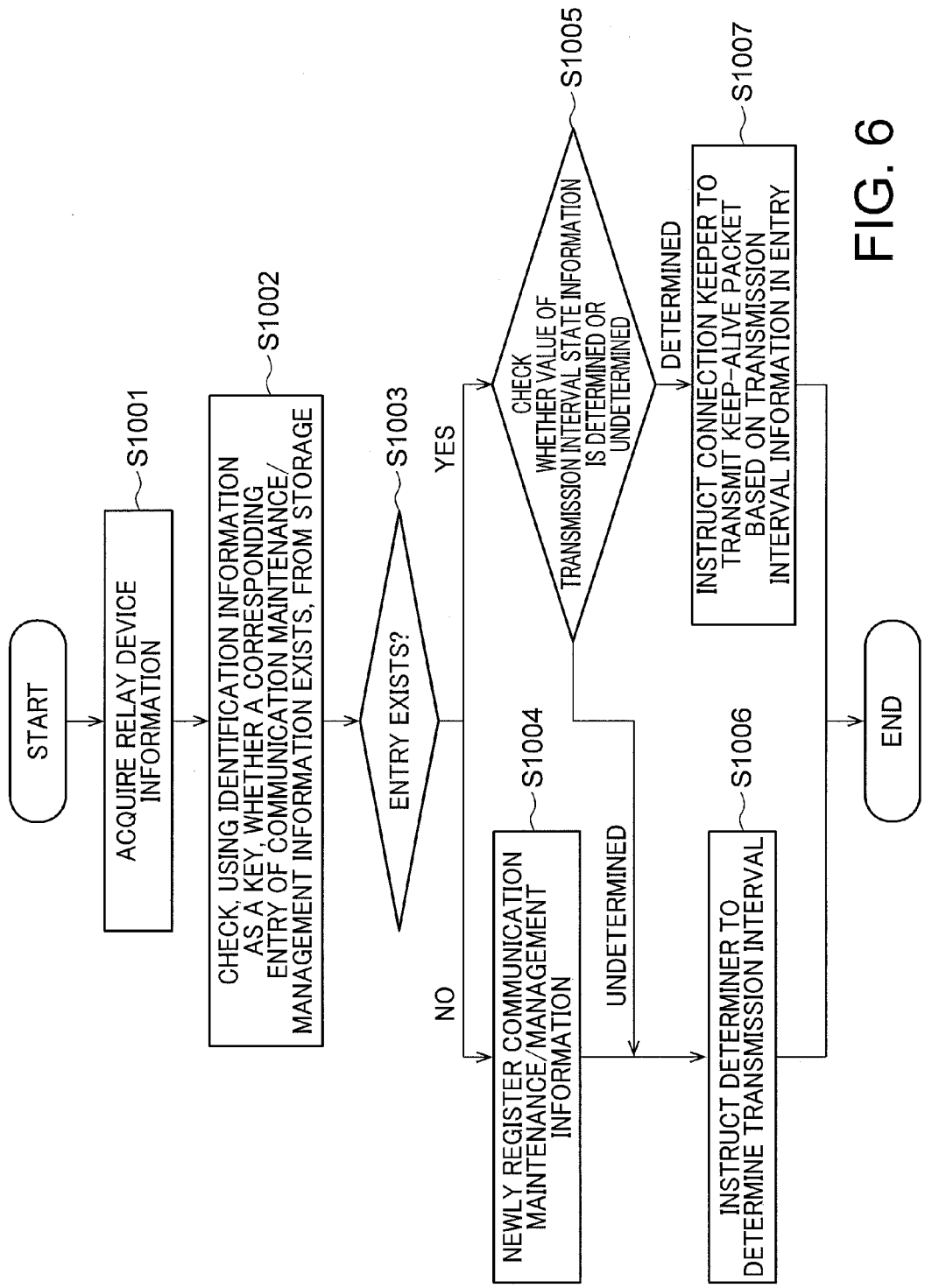
FIG. 6 is a diagram showing the operational flow of an acquisition unit of the communication device in the first embodiment.

FIG. 6 shows a flow chart of the operation of the acquisition unit 113 in the communication device 101. The start of the relay device 201 (e.g., initial start, restart, reinitialization) or the reset of a transmission interval (e.g., instructed by a user via an interface) causes the operation of this flow to start.

The acquisition unit 113 performs the operation of steps S1 to S4 in the communication sequence in FIG. 4 or FIG. 5 using the communicator 111 to acquire relay device information (S1001). The acquisition unit 113 accesses the storage 114 to check, using the identification information on the relay device 201 contained in the acquired relay device information as a key, whether a corresponding entry of communication maintenance/management information exists (S1002).

If there is no such an entry (NO in S1003), a new entry of communication maintenance/management information is added based on the relay device information acquired in step S1001 (S1004). Network information may be acquired concurrently with the relay device information, and in this case, the network information is contained together in the entry. Then, the determiner 115 is instructed to perform the transmission interval determining process (S1006).

In contrast, if such an entry exists, it is checked whether the value of transmission interval state information in the relevant entry is "determined" or "undetermined," (S1005), and if the value is "undetermined," the determiner 115 is instructed to perform the transmission interval determining process (S1006). If the value is "determined," which means that the value of transmission interval information is set in the relevant entry, the connection keeper 112 is instructed to transmit keep-alive packets at time intervals of the value (S1007). When WebSocket communication containing the setting of a TCP connection is started between the communication device 101 and the server device 301, the connection keeper 112 transmits keep-alive packets to the connection at transmission intervals instructed in step S1007.

Here, the instruction to the connection keeper 112 can be omitted in step S1007. In this case, upon receiving the notification that, for example, WebSocket communication has been started between the communication device 101 and the server device 301 from the communicator 111, the connection keeper 112 checks whether the value transmission interval state information in an entry indicates "determined" from the storage 114. Then, the value of transmission interval information in the entry is read out, and keep-alive packets are transmitted at time intervals of the value.

Figure 7:
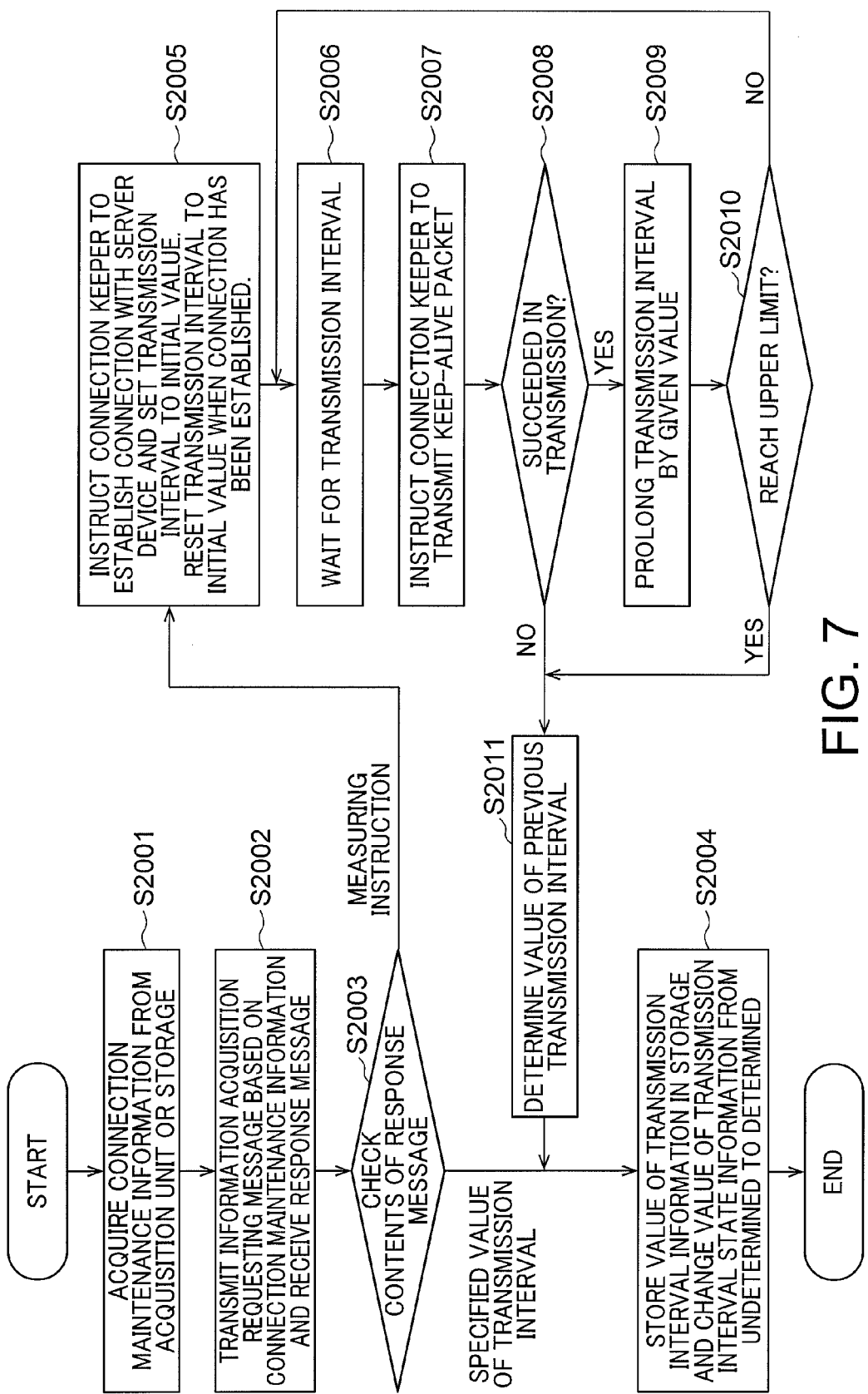
FIG. 7 is a diagram showing the operational flow of a determiner of the communication device in the first embodiment.

FIG. 7 is a flow chart showing the operation of the determiner 115 in the communication device 101. The determiner 115 starts the operation upon receiving an instruction to perform the transmission interval determining process from the acquisition unit 113.

The determiner 115 acquires connection maintenance information (at least one of relay device information and network information) from the acquisition unit 113 or the storage 114 (S2001). The determiner 115 creates an information acquisition requesting message based on the acquired connection maintenance information, transmits the information acquisition requesting message to the server device 301, and receives a response message from the server device 301 (S2002). This is equivalent to the communication sequence of steps S5 and S6 in FIG. 4 or steps S5 and S7 in FIG. 5.

The determiner 115 checks the content of the response message (S2003), and if transmission interval information is contained in the response message, the value of the transmission interval information is set to the relevant entry in the storage 114, and the value of the transmission interval state information is changed from "undetermined" to "determined" (S2004).

If a measuring instruction is contained in the response message, the determiner 115 performed a transmission interval measuring process (S2005 to S2011). First, the determiner 115 instructs the connection keeper 112 to establish a connection with the server device 301 and sets the transmission interval to an initial value (e.g. a minimum value) (S2005). The establishment of the connection may be the establishment of a WebSocket connection, or otherwise may be the establishment of a connection under the other communications protocol as long as the establishment involves the establishment of a TCP connection. The determiner 115 waits for a transmission interval of the value that is set in S2005 and instructs the connection keeper 112 to transmit a keep-alive packet based on the established TCP connection (S2007). Although a keep-alive packet (a packet relating to the second information) is used here as a packet transmitted for measurement, a packet of a type other than this (a packet relating to third information that is different from the above-mentioned first information and the second information) may be used as long as a response from a transmission destination (e.g., ACK) can be acquired.

After the transmission instruction of a keep-alive packet, the determiner 115 determines whether the transmission of the keep-alive packet has succeeded (S2008). For example, it is determined that the transmission has succeeded when a response packet for the keep-alive packet is received from the server device 301. If a TCP connection (NAT entry) is deleted by the relay device 201 or the like due to timeout or the like, the packet is discarded and no response packet is received from the server device 301.

Alternatively, some relay device 201 transmits a reset packet as a response there if no relevant NAT entry, and if a reset packet is received, it may be determined that the transmission of the keep-alive packet has failed.

If it is determined that the transmission of a keep-alive packet has succeeded, the determiner 115 updates the transmission interval by adding a given value to the current value of transmission interval (S2009). The transmission interval is thereby prolonged by the certain amount of time. The determiner 115 determines whether the value of the updated transmission interval reaches its upper limit (S2010). If the value of the updated transmission interval does not reach the upper limit (NO), the determiner 115 waits for the updated transmission interval (S2006), and instructs again the connection keeper 112 to transmit a keep-alive packet (S2007).

If it is determined that the transmission of the keep-alive packet has failed (NO in step S2008), or if the value of the updated transmission interval reaches its upper limit (YES in step S2010), the determiner 115 makes the previously updated value of the transmission interval the final value of the transmission interval (S2011). The previously updated value of the transmission interval is a value of transmission interval that has been acquired (updated) immediately before the transmission interval with which the transmission is determined in step S2008 to have failed, or the value of the transmission interval that has been acquired (updated)

immediately before the transmission interval that is determined to reach its upper limit. When the value of the transmission interval is finalized, the final value of the transmission interval is set to the relevant entry in the storage 114, and the value of the transmission interval state information is changed from "undetermined" to "determined" (S2004).

As seen from the above, in the transmission interval measuring process, a transmission interval is increased step by step from its initial value (e.g., minimum value), if transmission fails, the transmission interval is caused to fall back to the previous transmission interval, and the value thereof is determined as the transmission interval. As a specific example, when a minimum transmission interval is determined to be one minute, a transmission interval is increased beginning from this one minute so as to be two minutes, three minutes, . . . , and when transmission fails, the transmission interval is caused to fall back to the previous transmission interval and the value thereof is determined to be the transmission interval. If the updated value reaches its upper limit in step S2009 in mid-flow, the upper limit is determined to be the transmission interval. As a method of determining the upper limit, for example, in order to avoid the transmission interval being prolonged longer than 60 minutes, this 60 minutes is made to be the upper limit.

Although the upper limit is provided here, the update of the transmission interval and the transmission of a keep-alive packet may be repeatedly performed until the transmission fails, without the upper limit provided.

In addition, a given value is added in step S2009 to update the transmission interval, the value of the transmission interval may be exponentially increased like one minute, two minutes, four minutes, and eight minutes.

In addition, a value having the highest probability may be made to be the initial value rather than the minimum value of the transmission interval. As an example, if the relay device information contains a timeout value of TCP communication, this timeout value may be used as the initial value. At this point, if the transmission of the first keep-alive packet succeeds, the value of the transmission interval is increased every succession of transmission, and if the transmission fails, the previous value is determined to be the transmission interval. If the first transmission fails, the value of the transmission interval is decreased until transmission succeeds, and a value at which the transmission succeeds is determined to be the transmission interval. At this point, a lower limit and an upper limit are provided, and if a transmission interval reaches the lower limit or the upper limit, the lower limit or the upper limit may be determined to be the value of the transmission interval.

Note that, in the flow chart shown in FIG. 7, the feedback process of transmission interval information (measurement result) that is performed in step S8 in FIG. 5 is not shown, but a step of the feedback may be added to the operation flow of FIG. 7 (next to step S2003 or step S2011).

In addition, if the acquisition unit 113 cannot acquire relay device information in step S1001 in FIG. 6 and there is no entry of communication maintenance/management information in the storage 114, the determiner 115 may determine the value of a transmission interval of keep-alive packets by performing the transmission interval measuring process (S2005 to S2011). Then, an entry of communication maintenance/management information in which the value of the determined transmission interval is set to transmission interval information may be registered in the storage 114. In this case, the value of the relay device information may not be set to the entry. As the entry identification information, for example, the MAC address of the relay device 201 may be used.

As described above, according to the present embodiment, in order to keep a connection between a server device and a communication device, a transmission interval having a value as long as possible is determined, taking into consideration the state of a communication route such as the relay device 201 or the network upstream thereof. It is thereby possible to reduce the load and traffic on the server device as compared with a conventional case where a communication device always transmits keep-alive packets at minimum transmission intervals, reducing a communication cost. For example, in the case where the minimum value of the transmission interval is one minute, if the transmission interval can be prolonged up to 60 minutes in average (as things stand, many relay devices 201 (broadband routers) have TCP timeout periods longer than or equal to 60 minutes), the cost can be reduced to 1/60 with a simple calculation.

Second Embodiment

Figure 8:
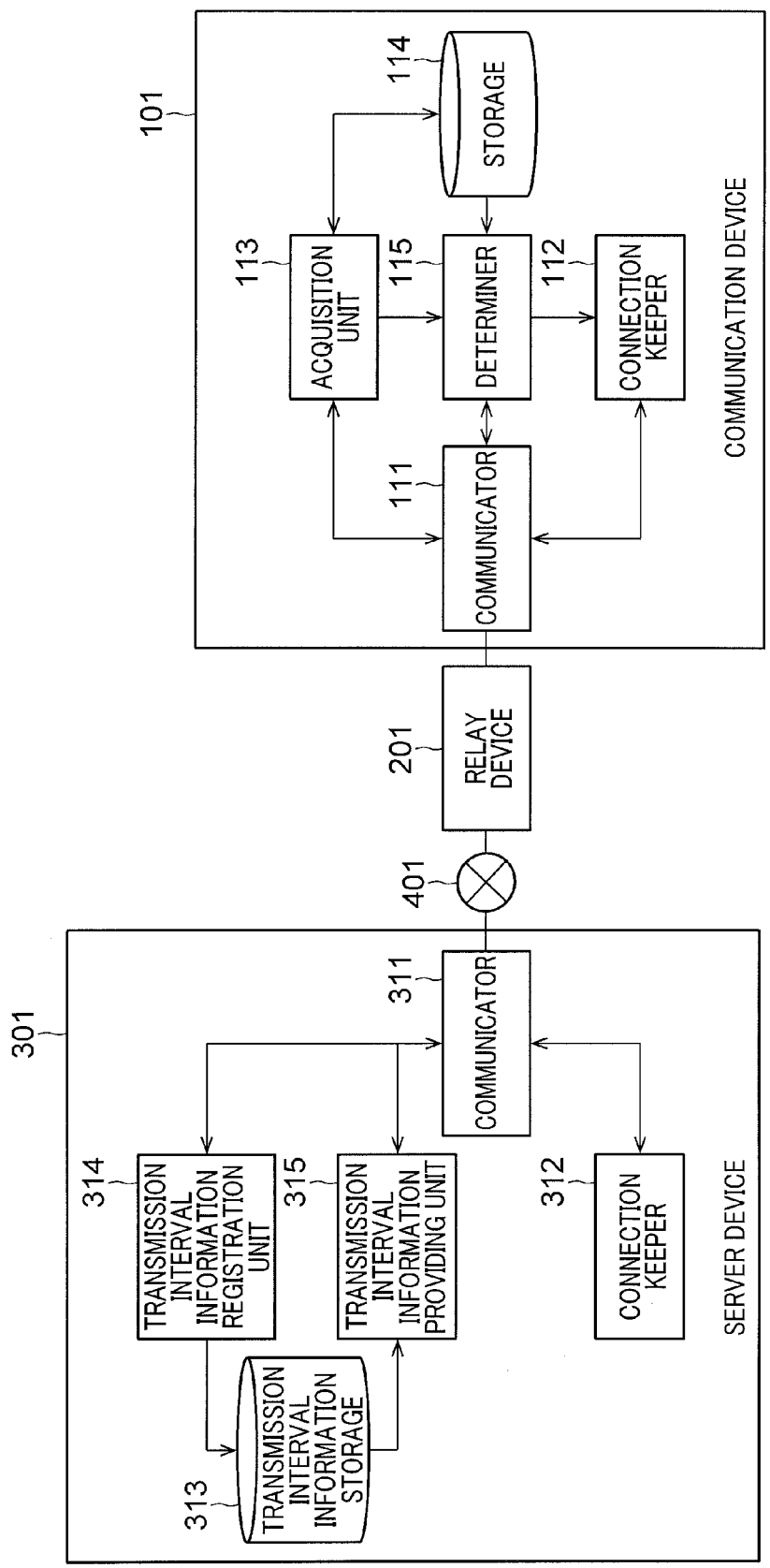
FIG. 8 is a diagram showing a communication system in a second embodiment.

FIG. 8 shows a communication system in a second embodiment. Components named similarly to those in FIG. 1 are denoted by the same reference numerals, and redundant descriptions thereof will be omitted unless the operations are extended or altered.

The entire system configuration is similar to that in the first embodiment, and the basic configuration of the communication device 101 is also similar to that in the first embodiment. The difference from the first embodiment is mainly in the configuration of the server device 301. The present embodiment describes a form in which the server device 301 and the communication device 101 cooperate to determine a transmission interval of keep-alive packets.

The server device 301 includes a communicator 311, a connection keeper 312, a transmission interval information storage 313, a transmission interval information registration unit 314, and a transmission interval information providing unit 315. The communicator 311 has a function similar to that of the communicator 111 of the communication device 101. A communicator 311, a connection keeper 312, a transmission interval information registration unit 314, and a transmission interval information providing unit 315 may be implemented by a processor such as a CPU executing computer programs. A communicator 311, a connection keeper 312, a transmission interval information registration unit 314, and a transmission interval information providing unit 315 can implemented by circuitry such as a processor or an integrated circuit. Each circuitry which implements a communicator 111, a connection keeper 112, an acquisition unit 113 and a determiner 115 may be different physical circuitry or all or a part of them may be same physical circuitry. The transmission interval information storage 313 may be configured by any storage device such as a memory or storage. The memory may be volatile memory such as SRAM or DRAM, or non-volatile memory such as NAND, FRAM or MRAM. The storage may generally be any device which can memorize data permanently such as an HDD, an optical disc or SSD. The term "circuitry" may indicate one circuit, a plurality of circuits, or a system of circuits.

As an operational difference from the connection keeper 112 of the communication device 101, the connection keeper 312 of the server device 301 have no opportunity of measuring instruction from the acquisition unit 113 (because the acquisition unit 113 is originally absent on the server device 301 side).

The connection keeper 312 operates, as an example, cooperating with the connection keeper 112 of the communication device 101. In the state where the connection keeper 112 is caused to stop its operation, the value of a transmission interval (a candidate value of the transmission interval) is acquired through measurement by transmitting keep-alive packets while varying the transmission interval, as with the communication device 101 in the first embodiment. Then, the transmission interval is determined based on the acquired value and the value measured by the communication device 101 (the candidate value of the transmission interval). For example, the smaller value between the both candidate values is employed, and a packet that contains specifying information to specify the value as the transmission interval of keep-alive packets is transmitted to the communication device 101. The communication device 101 uses the value of the specifying information notified from the server device 301 as the transmission interval of keep-alive packets. Note that, taking into consideration delays in the network 104 or operational delays in the server device 301, the connection keeper 312 of the server device 301 may determine a value obtained by adding a certain margin value to the above-described employed value as the transmission interval. Although the final transmission interval is determined here on the server device 301 side but may be determined on the communication device 101 side (e.g., the determiner 115). In this operational example, the connection keeper 312 of the server device 301 may or may not periodically transmit keep-alive packets after starting a WebSocket communication with the communication device 101. In the case where keep-alive packets are also transmitted from the server device 301, conductivity from the server device 301 to the communication device 101 can be more reliably secured. That is, various types of devices and the like can exist in the network 401, and there may be a device configuration in which timeout is distinguished by communication directions, or a device configuration in which ACK packets of TCP do not have influence on timeout, but by transmitting keep-alive packets also from the server device 301, it is possible also in such a case to secure the conductivity from the server device 301 to the communication device 101.

In addition, there may be a variation in which the server device 301 transmits a keep-alive packet in response to the reception of a keep-alive packet from the communication device 101. For example, the communication device 101 and the server device 301 may alternately transmit keep-alive packets at the same transmission intervals, and the transmission interval may be prolonged only after the transmissions of the keep-alive packets from both devices succeed (refer to step S2009 in FIG. 7). Specifically, the communication device 101 transmits a keep-alive packet to the server device 301, and the server device 301 transmits a response packet as a response. After transmitting the response packet, the server device 301 transmits keep-alive packets at the same transmission intervals as those of the communication device 101 and receives response packets from the communication device 101.

In this case, since the transmission of the keep-alive packets from the both devices succeeds, the transmission interval is prolonged, and the same process is repeated. The value of the transmission interval used by the communication device 101 and the server device 301 may be synchronized by storing the value of the transmission interval in keep-alive packets, or may be synchronized by the other methods. Although a keep-alive packet to be an opportunity is transmitted here from the communication device 101, the keep-alive packet to be an opportunity may be transmitted, in the reversed order, from the server device 301.

In the first embodiment, the conductivity from the communication device 101 to the server device 301 can be ensured, but the opposite (i.e., the conductivity from the server device 301 to the communication device 101) cannot be always ensured. As mentioned above, the conductivity in the both direction can be ensured only after the success in the transmission from the server device 301 is confirmed.

In the transmission interval information storage 313, first connection management information in which identification information on the relay device 201 is associated with transmission interval information is stored. In addition, second connection management information in which network information (at least one of network identification information and contracted provider identification information) is associated with the transmission interval information is stored. Only one of the first and second connection management information can be stored. FIG. 9 shows an example of the first connection management information (upper half) and the second connection management information (lower half).

In order to collect pieces of transmission interval information (measurement results) from a large number of communication devices to response the value of a transmission interval with a high degree of reliability, the first or second connection management information may contain the number of samples (the number of users from which the measurement results are collected) as an attribute. In the example of FIG. 9, the sample number attribute is also provided. The transmission intervals (measurement result) returned from the large number of communication devices are basically assumed to be the same value when the values are of the order of minutes, but even if there are some different values, if sample values from users of a predetermined proportion or more, or a predetermined proportion or more of number of sample values are the same value, the same value may be employed, and the other sample values may be ignored as deviating values. Alternatively, the average, median, or the like of the values returned from the large number of communication devices may be made to be the value of transmission interval information.

As the network information, there are a network service provider that provides physical lines and a provider that provides upper services, and the example of the second connection management information in FIG. 9 provides an item of network identification information that corresponds to the former and an item of contracted provider identification information that corresponds to the latter.

As another example, data may be configured to have pieces of transmission interval information for each of the network identification information and the contracted provider identification information.

The transmission interval information providing unit 315 is the reception destination of an information acquisition requesting message that is transmitted from the communication device 101 (the reception destination of a device information acquisition request message that is transmitted in step S3 in FIG. 4). On the basis of relay device information (model information contained therein), network information (network identification information or provider identification information contained therein), or both of them contained in this requesting message, the transmission interval information providing unit 315 acquires the relevant transmission interval information from the transmission interval information storage 313 and transmits a response message containing the relevant transmission interval information (refer to step S6 in FIG. 4) to the communication device 101.

In more detail, if only the relay device information is contained in the information acquisition requesting message, the transmission interval information providing unit 315 specifies transmission interval information associated with the relevant relay device 201 from the first connection management information and transmits the transmission interval information to the communication device 101 as a response. If only the network information is contained therein, the transmission interval information providing unit 315 specifies transmission interval information associated with the relevant network information from the second connection management information and transmits the transmission interval information to the communication device 101. If both of them are contained therein, the transmission interval information providing unit 315 transmits transmission interval information having the smaller value, transmission interval information having the larger value, or both of them, to the communication device 101.

If neither relay device information nor network information is contained therein, or only one of them is contained, a measuring instruction message for a transmission interval may be transmitted to the communication device 101. Otherwise, while the number of samples does not reach a given number, a response message containing measuring instruction may be transmitted to the communication device 101 regardless of whether relay device information or network information is contained in the information acquisition requesting message (refer to step S7 in FIG. 5).

The transmission interval information registration unit 314 is the feedback destination of the transmission interval information (measurement result) that is transmitted from the communication device 101 (refer to step S8 in FIG. 5). The connection maintenance information and the transmission interval information contained in this feedback message are acquired, and the transmission interval information storage 313 is updated as needed. For example, if an entry of the first connection management information corresponding to the same model as the relay device 201 exists and the value of the fed-back transmission interval information is the same as the value of the entry, the number of samples is increased by one. Note that if there is past feedback from the same communication device 101 (user), the number of samples may not be increased. If the value of the fed-back transmission interval information is different from that of the relevant entry of the first connection management information, it is possible to update the value of transmission interval in the first connection management information as needed by the above-mentioned method.

In addition, for example, assume that the timeout period (connection keeping period. i.e., a transmission interval thereby determined) of a certain broadband router is found to be 60 minutes based on a large number of samples and is registered in the storage 313 being associated with relay device identification information (model information). In this case, when the transmission interval of the communication device 101 is subordinate to this broadband router measures 15 minutes and a timeout period in the environment of the network 104 is unknown, it can be determined that the environment of this network 104 is highly likely a factor in determining the transmission interval of the communication device 101 to be 15 minutes. Thus, this value may be associated with network information and registered in the storage 313 as an entry of second connection management information.

As described above, according to the present embodiment, causing a communication device to measure a transmission interval in an actual field and causing the server device 301 to report the measurement result allows the server device 301 to determine the most suitable transmission interval even in the case where there is a relay device the TCP connection timeout period of which is unknown or a network route the timeout period of which is unknown. In addition, according to the present embodiment, it is possible to ensure conductivity from the server device 301 to the communication device.

Third Embodiment

Figure 10:
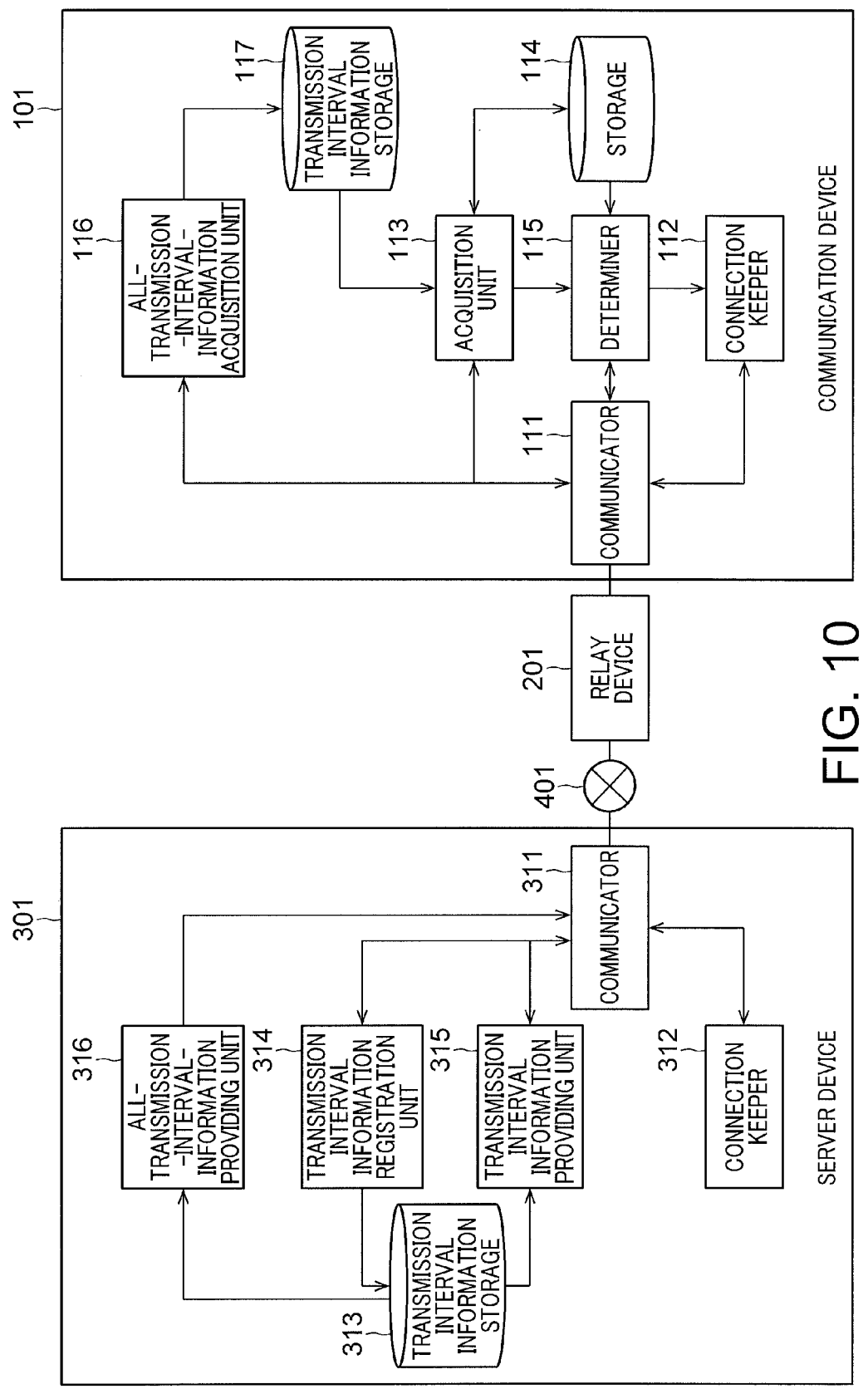
FIG. 10 is a diagram showing a communication system in a third embodiment.

FIG. 10 shows a communication system in a third embodiment. Components named similarly to those in FIG. 1 or FIG. 8 are denoted by the same reference numerals, and redundant descriptions thereof will be omitted unless the operations are extended or altered.

The communication device 101 includes, in addition to the configuration in the first and second embodiments, a transmission interval information storage 117, and an all-transmission-interval-information acquisition unit 116. The transmission interval information storage 117 is a storage to store the same data as that in the transmission interval information storage 117 on the server device 301 side described in the second embodiment. This data may be preset in the communication device 101. Alternately, using the update of firmware running on the communication device 101 or the like as an opportunity, data in the transmission interval information storage 313 of the server device 301 may be downloaded to the communication device 101 to reflect the latest information in the transmission interval information storage 117 by the operations of an all-transmission-interval-information providing unit 316 on the server device 301 side and the all-transmission-interval-information acquisition unit 116 on the communication device 101 side.

The all-transmission-interval-information acquisition unit 116 of the communication device 101 acquires all the data items in the transmission interval information storage 117 from the server side. This acquisition may be performed in the form of updating the firmware together with the other system information, or may be the acquisition of only the data items in this transmission interval information storage. Conceivable acquisition timing has a great variety, including the timing of firmware update. For example, the timing may be one at which an update notice is received from the server device 301 via a kept communication connection, or may be one at which the update of the transmission interval information is detected by periodically accessing the server device 301.

The server device 301 includes, in addition to the configuration in the second embodiment, an all-transmission-interval-information providing unit 316. The all-transmission-interval-information providing unit 316 provides all the data items in the transmission interval information storage 117 to the communication device 101. All the data items in question may be contained in the latest firmware to be provided to the communication device 101, and in this case, all-transmission-interval-information providing unit 316 may be driven by an administrator on the server side. Alternatively, all-transmission-interval-information providing unit 316 may be driven in response to a request from the all-transmission-interval-information acquisition unit 116 of the communication device 101 and may read out all the data items in transmission interval information storage 117 and provide them to the communication device 101. Alternatively, the all-transmission-interval-information providing unit 316 may detect a change in the contents of the transmission interval information storage 313 on the server device 301 side and provide an update notice to the communication device 101. After the provision of the update notice, in response to a request from the communication device 101, all the data items in the transmission interval information storage 117 may be read out and provided to the communication device 101.

The communication device 101 can determine a transmission interval using the data items in the transmission interval information storage 117. The transmission interval is determined by the determiner 115 from relay device information or network information (the network information may be manually acquired by a user) acquired by the acquisition unit 113, based on the data items in the transmission interval information storage 117. The details of the operation are apparent from the description in the first or second embodiment and will not be described. This eliminates the operation in steps S5 and S6 in FIG. 4 in the first embodiment, suppressing the communication cost as well.

The communication device and the server device as described above may also be realized using a general-purpose computer device as basic hardware. That is, each function block (or each section) in the communication device and the server device can be realized by causing a processor mounted in the above general-purpose computer device to execute a program. In this case, the communication device and the server device may be realized by installing the above described program in the computer device beforehand or may be realized by storing the program in a storage medium such as a CD-ROM or distributing the above described program over a network and installing this program in the computer device as appropriate. Furthermore, the storage may also be realized using a memory device or hard disk incorporated in or externally added to the above described computer device or a storage medium such as CD-R, CD-RW, DVD-RAM, DVD-R as appropriate.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, one or more microprocessors in conjunction with a DSP core.

As another example, the term "memory" may encompass any electronic component which can store electronic information. The "memory" may refer to various types of media such as random access memory (RAM), read-only memory (ROM), programmable read-only memory (PROM), erasable programmable read only memory (EPROM), electrically erasable PROM (EEPROM), non-volatile random access memory (NVRAM), flash memory, magnetic or optical data storage, which are readable by a processor. It can be said that the memory electronically communicates with a processor if the processor read and/or write information for the memory. The memory may be integrated to a processor and also in this case, it can be said that the memory electronically communication with the processor.

The term "storage" may generally encompass any device which can memorize data permanently by utilizing magnetic technology, optical technology or non-volatile memory such as an HDD, an optical disc or SSD.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A communication device comprising:
communication circuitry configured to establish a communication connection with a destination communication device over a communication network including at least one relay device and communicate a first packet using the communication connection, wherein the relay device is present on a communication route to the destination communication device;
first circuitry configured to determine a transmission interval of a keep-alive packet, based on characteristic information relating to the communication network including the relay device such that the transmission interval of the keep-alive packet is shorter that a connection keeping period of the relay device; and
second circuitry configured to perform control to transmit the keep-alive packet to the destination communication device using the communication connection in accordance with the transmission interval determined by the first circuitry during at least a time period when the communication connection is established and communication of the first packet is not performed.

2. The communication device according to claim 1, wherein the communication network includes a first relay device to which the communication device is connected and an upstream network of the first relay device, and the characteristic information relating to the communication network includes information relating to the first relay device.

3. The communication device according to claim 1, wherein
the communication network includes a first relay device to which the communication device is connected and an upstream network of the first relay device, and
the characteristic information relating to the communication network includes at least one of identification information relating to a network service provider of the upstream network and identification information relating to a network provider of the upstream network.

4. The communication device according to claim 1, wherein the first circuitry is configured to, based on association data between the characteristic information relating to at least one communication network and a packet transmission interval, determine the transmission interval from the characteristic information relating to the communication network.

5. The communication device according to claim 1, further comprising third circuitry configured to acquire the characteristic information relating to the communication network by communicating with the relay device.

6. The communication device according to claim 5, further comprising:
a storage configured to store state information that indicates whether the transmission interval has been determined, wherein
when the state information read out from the storage indicates that the transmission interval has not been determined, the first circuitry is configured to determine, when the state information read out from the storage indicates that the transmission interval has not been determined, the transmission interval based on the characteristic information relating to the communication network acquired by the third circuitry.

7. The communication device according to claim 1, wherein the first circuitry is configured to transmit the characteristic information relating to the communication network to the destination communication device, receive a response message including information relating to transmission interval transmitted from the destination communication device, and determine the transmission interval in accordance with the information included in the response message.

8. The communication device according to claim 1, wherein the first circuitry is configured to perform a measuring process of transmitting the keep-alive packet or a third packet using the second circuitry, varying a transmission interval of the keep-alive packet or the third packet, and judging whether transmission of the keep-alive packet or third packet is successful, and determine the transmission interval based on a result of the measuring process.

9. The communication device according to claim 8, wherein the first circuitry is configured to transmit the characteristic information relating to the communication network to the destination communication device, receive a response message including instruction information on the measuring process of the transmission interval transmitted from the destination communication device, and perform the measuring process in accordance with the instruction information included in the response message.

10. The communication device according to claim 8, wherein the first circuitry is configured to increase a transmission interval of the keep-alive packet or the third packet each time the transmission of the keep-alive packet or the third packet is successful, and determine, when the increased transmission interval reaches an upper limit or when the transmission of the keep-alive packet or the third packet fails with the increased transmission interval, the transmission interval based on the upper limit or a transmission interval of the keep-alive packet or the third packet immediately before the keep-alive packet or the third packet that failed in transmission.

11. The communication device according to claim 8, wherein the first circuitry is configured to decrease a transmission interval of the keep-alive packet or the third packet each time the transmission of the keep-alive packet or the third packet fails, and determine, when the decreased transmission interval reaches a lower limit or when the transmission of the keep-alive packet or the third packet is successful with the decreased transmission interval, the transmission interval based on the lower limit or the transmission interval with which transmission of the keep-alive packet or the third packet succeeds.

12. The communication device according to claim 8, wherein the first circuitry is configured to transmit a message that contains a value of the determined transmission interval and the characteristic information relating to the communication network to the destination communication device.

13. A communication system comprising:
a first communication device; and
a second communication device connected to the first communication device over a communication network, wherein at least one relay device is present on a communication route from the first communication device to the second communication device,
wherein
the first communication device comprises:
first communication circuitry configured to establish a communication connection with the second communication device and communicate a first packet using the communication connection;
first circuitry configured to determine, based on characteristic information relating to the communication network including the relay device, a transmission interval of a first keep-alive packet such that the transmission interval of the first keep-alive packet is shorter than a connection keeping period which is set in the relay device; and
second circuitry configured to perform control to transmit the first keep-alive packet to the second communication device using the communication connection in accordance with the transmission interval determined by the first circuitry during at least a time period when the communication connection is established and communication of the first packet is not performed.

14. The communication system according to claim 13, wherein
the second communication device includes:
a storage configured to store association data between the characteristic information relating to the communication network and a packet transmission interval;
second communication circuitry configured to receive an acquisition requesting message including the characteristic information relating to the communication network, from the first communication device; and
processing circuitry configured to specify a transmission interval to the first communication device based on the characteristic information relating to the communication network included in the acquisition requesting message and the association data, and control transmitting a response message including information on the specified transmission interval, to the first communication device.

15. The communication system according to claim 14, wherein
the second communication circuitry is configured to receive a message including a value of the transmission interval determined by the first communication device and the characteristic information relating to the communication network, from the first communication device, and
the second communication device further comprises third circuitry configured to control storing, in the storage, the characteristic information relating to the communication network and the value of the transmission interval included in the received message, and associate the characteristic information relating to the communication network with the value of the transmission interval.

16. The communication system according to claim 14, wherein
- the second communication device further includes fourth circuitry configured to provide data stored in the storage to the first communication device,
- the first communication device comprises a storage configured to store the data provided from the fourth circuitry, and
- the first circuitry of the first communication device is configured to determine the transmission interval based on the characteristic information relating to the communication network and the data stored in the storage.

17. The communication system according to claim 13, wherein
- the first communication device is configured to perform a first measuring process of transmitting the first keep-alive packet or a third packet, varying a transmission interval of the first keep-alive packet or the third packet, and judging whether transmission of the first keep-alive packet or the third packet is successful, and determine a first transmission interval candidate based on a result of the first measuring process,
- the second communication device is configured to perform a second measuring process of transmitting a second keep-alive packet or a fourth packet, varying a transmission interval of the second keep-alive packet or the fourth packet, and judging whether transmission of the second keep-alive packet or the fourth packet is successful, and determine a second transmission interval candidate based on a result of the second measuring process,
- one of the first communication device and the second communication device is configured to determine the transmission interval based on the first and second transmission interval candidates that are determined by the first communication device and the second communication device, and
- the second circuitry of the first communication device is configured to control transmission of the first keep-alive packet in accordance with the transmission interval determined by the one of the first communication device and the second communication device.

18. A communication method performed by a computer, the method comprising:
- establishing a communication connection with a first communication device over a communication network and communicating a first packet using the communication connection, wherein at least one relay device is present on a communication route to the first communication device;
- determining a transmission interval of a keep-alive packet, based on characteristic information relating to the communication network such that the transmission interval of the keep-alive packet is shorter than a connection keeping period of the relay device; and
- performing control to transmit the keep-alive packet to the first communication device using the communication connection in accordance with the transmission interval determined, during at least a time period when the communication connection is established and communication of the first packet is not performed.

* * * * *